March 5, 1940.  W. E. URSCHEL  2,192,247
REGULATOR FOR BEET TOPPER
Filed Sept. 5, 1933  2 Sheets-Sheet 1

INVENTOR.
William E. Urschel
BY
ATTORNEYS.

Patented Mar. 5, 1940

2,192,247

UNITED STATES PATENT OFFICE 2,192,247

REGULATOR FOR BEET TOPPERS

William E. Urschel, Valparaiso, Ind.

Application September 5, 1933, Serial No. 688,101

11 Claims. (Cl. 146—85)

This invention relates to an automatic regulator for a topping device used with sugar beet harvesting machines and the like, and has particularly to do with an apparatus of the character set forth in the application for Letters Patent in the name of William E. Urschel, Serial Number 537,410, filed May 14, 1931, issued July 3, 1934, as Patent No. 1,964,896, and entitled Beet harvester.

In sugar beets, the top portion of the body of the beet is low in sugar content and is of such a degree of toughness that it may cause injury to the various machines used in the recovery of beet juice for the production of sugar. It is, therefore, desirable to remove this portion of the beet possessing low sugar content from the body of the beet, such part being relatively small in proportion to the body of the beet. Such top portions of low sugar content vary proportionately with the size of the beet, necessitating the removal of a larger part from large beets than from the smaller ones.

Since beets in the field are grossly irregular as to size, any attempt to top beets with knives set in a fixed position has proven wholly unsuccessful. When the knives have been set to properly top a large beet, too great a part is removed from the small beets. Attempts to set knives to sever the proper amount of top from the average size beet have not been successful owing to the great variance in the size of sugar beets making a run of average size beets actually a marked rarity.

There have also been machines constructed to remove such portions of low sugar content from the body of the beet before the beet has been removed from the soil. This method of topping has not proven satisfactory due to the great variance in the height of the top of the body of the beet above the soil and the proximity of the beets one to another. Even though automatically adjusted knife members be incorporated in the embodiment of such a machine, these factors in beet growth just mentioned do not permit of ample time for the knife members to adjust themselves as they approach each beet, if the machine is to be operated at a rate of speed deemed necessary for commercial success.

The most successful beet harvesters are those which remove the beet from the soil and convey the beets to a topping mechanism incorporated in the machine. Instead of having the knives to act upon the beets while grasped by the pulling members or means as is the conventional manner adapted in most of the harvesters of this type which combine topping members, in the present device the beets are removed from the pulling means and subsequently presented to the knives by special guiding instrumentalities.

The guide members convey the beets rearwardly in the machine and also aline the top portions of the body of the beets in the same plane before presenting them to the cutting instrumentalities. Beets presented to the cutters in this manner may be properly topped by varying the position of the cutting plane of the knives relative to the plane with which the tops of the bodies of the beets are alined.

To insure a proper positioning of the knife members beneath the plane of the top of the body of the beet in the guiding members, there has been herein provided an adjustment for said knives which adjustment is controlled by each beet to be topped. In this manner a satisfactory result is attained in respect to the removal of the proper portion of the crop along with the leaf appendages.

One of the objects of the invention is to provide an automatic regulator for a beet topping mechanism and particularly one used in a sugar beet harvester, governing the amount severed from the top of the body of the beet in accordance with the size of each individual beet presented to said topping means.

Another object of the machine is to provide an adjustable holder for a topping means embodied in a sugar beet harvesting machine or otherwise permitting of the regulation of the position of the topping means before acting upon each sugar beet presented to it, thereby enabling the amputation of varied sized portions of the top from the body of the beet, said portion being determined by the size of the beet.

These and such other objects as may hereinafter appear are attained by the mechanism illustrated in the accompanying drawings illustrating one form of the invention and in which.

Similar numerals refer to similar parts throughout the several views and in the description of the device which follows.

Figure 1:
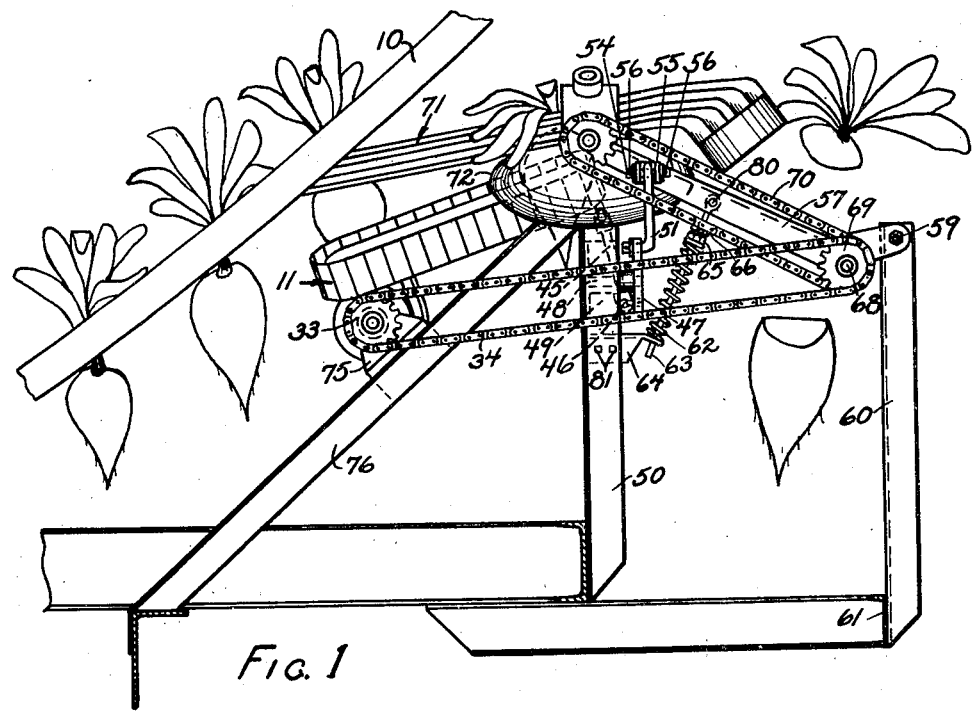
Figure 1 is a side elevation of a mechanism embodying the invention when attached to a sugar beet harvester of the character set forth in the application for Letters Patent of the applicant, William E. Urschel, serially numbered 537,410, filed May 14, 1931, issued July 3, 1934, as Patent No. 1,964,896, and entitled Beet harvester.
Figure 2:
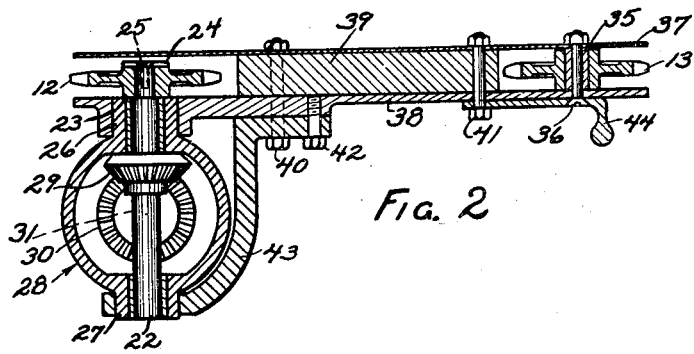
Figure 2 is a sectional view of the beet gauging mechanism taken on the line 2—2 in Figure 5 and looking in the direction indicated by the arrows.

Beets removed from the soil by a sugar beet harvester such as has been mentioned are grasped by the puller belts 10 (Figure 1) and conveyed along an arcuate path upwardly and rearwardly in the machine. When travelling along this path, the beets come into contact with two oppositely disposed gauging chains 11, driven by the sprockets 12 and idling upon the sprockets 13 (Figure 2).

Figure 3:
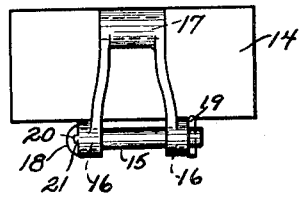
Figure 3 is a plan view of one of the links in the beet gauging chain.

Chain 11 is made up of a series of links 14 (Figure 3) joined by pins 15 inserted in circular apertures 16 and 17 formed in said link. Pins 15 are held in position by rounded heads 18 at one end and by cotter pins 19 inserted at their other end.

A slot 20 in the rounded head 18 engaging with a projection at point 21 formed on the link 14 and prevents pin 15 from rotating in the circular apertures 16. The speed of travel of the chains 11 is synchronized with that of the puller belts and conveying speed of the roller bars 71 allowing the beets grasped by the puller belts to remain in the same vertical alinement they assumed before coming into contact with the chains 11.

Drive sprocket 12 which is keyed to a shaft 22 is held against vertical movement along shaft 22 by a shoulder at point 23 and a washer 24 secured by screw 25 in threaded relation with a threaded aperture in the end of said shaft. Shaft 22 is journalled in babbitted bearings 26 and 27 formed in a gear housing 28.

Bevel gear 29 keyed to shaft 22 is driven by a bevel gear 30 keyed to shaft 31, journalled in an elongated bearing 32 (Figures 4 and 5) integral with the gear housing 28. Sprockets 33 driven by the chain 34 are keyed to the outer extremities of shafts 31 thereby providing the means for driving the gauging chains 11.

The elongated bearings 32 of the gear housings 28 are secured in brackets 75 in any conventional manner. Brackets 75 are fastened to diagonal frame members 76 by bolts 78.

The idler sprocket 13 (Figure 2) rotates upon a bushing 35 held rigid between a plate 37 and casting 38 by the bolt 36. Plate 37 protecting the sprockets 12 and 13 from dirt and injurious foreign material is held in position by means of bolts 40 and 41 and spacer member 39.

Member 43 is secured to the casting 38 by means of bolt 40 and a capscrew 42. Both members 38 and 43 are rotatably mounted upon the outside of bearings 26 and 27 thus enabling the idling ends of the gauging chains 11 to move inwardly or outwardly in relation to the center of the longitudinal path of the beets being carried rearwardly in the machine.

Figure 4:
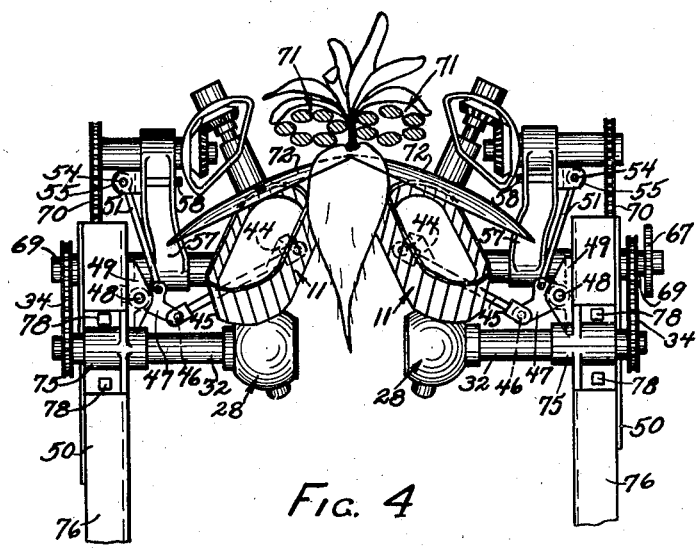
Figure 4 is an end elevation of the invention looking toward the rear of the machine.
Figure 5:
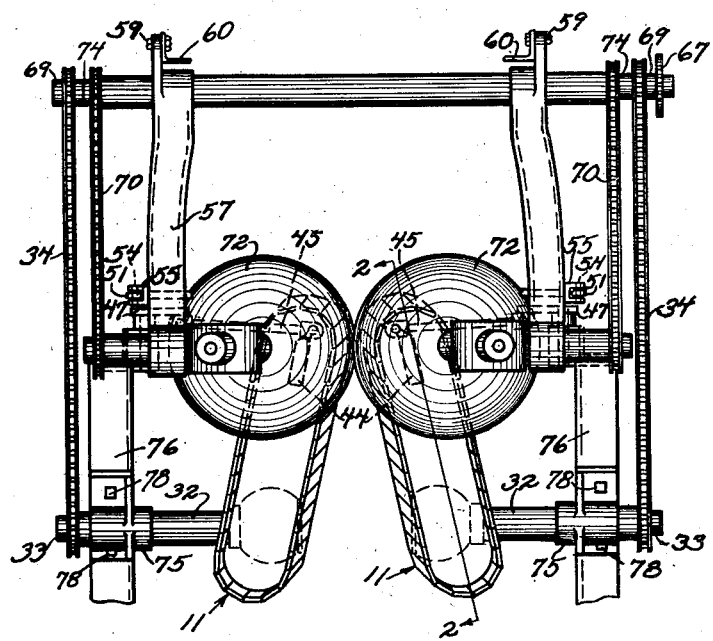
Figure 5 is a plan view of the topping knives and their positioning mechanism.

Member 44 fastened to casting 38 by bolts 36 and 41 has a ball shaped section at its projecting end which is fitted into a socket at one end of link 45 (Figures 4 and 5). A ball shaped stud 46 in threaded relation with a lever 47 is fitted in a socket at the other end of link 45.

Lever 47 is pinned to a stud 48 rotatably mounted in a bearing 49 bolted to vertical frame members 50. Link 51 pivotally mounted upon lever 47 is secured by a washer 52 and pin 53. Pin 54 is mounted in a slotted head of pin 55 and is slipped through an eye in one end of link 51 and held in position by pins 56. Bolts 59 (Figure 1) pivotally secure knife holder 57 to vertical frame members 60 bolted to a transverse frame member 61.

A spring 62 resiliently mounted upon an eyebolt 63 raises the knives after they have acted upon a beet allowing the knives to be reset by the herein described mechanism when the next beet is presented to the cutting means. Eyebolt 63 is pivotally mounted upon the knife holder 57 by the pin 80 and reciprocably mounted in an angle iron 64 attached to the vertical frame member 50 by bolts 81. Nut 65 in threaded relation with the eyebolt 63 permits the tension in spring 62 to be regulated and may be held fixed in any position by a locknut 66.

The main drive sprocket 67 (Figure 5) keyed to shaft 68 (Figure 1) provides means for operating the device and the knives through sprockets 69 and 74 and the chains 34 and 70.

Sugar beets grasped by the puller belts 10 (Figure 1) are carried upwardly and rearwardly in the machine until they reach the roller bars 71 which bars remove the beets from the puller belts and present them to the knives 72. A complete description of the roller bars may be found in the application for Letters Patent in the name of William E. Urschel, serially numbered 537,410, filed May 14, 1931, issued July 3, 1934, as Patent No. 1,964,896, and entitled Beet harvester. The roller bars not only convey the beets rearwardly but also raise the beets upwardly in such manner as to aline the tops of the body of each beet in the same plane. Beets presented in this manner may be properly topped by simply regulating the distance of the cutting plane of the knives below the plane with which the top of the bodies of the beets are alined.

The beets carried rearwardly by the roller bars come into contact with the two gauging chains 11 which travel at the same rate of speed as do the puller belts, and the rearward conveying speed of the roller bars. This synchronization of speed of travel allows the beets to assume the same vertical alinement they held before coming in contact with said chains.

The beets continuing rearwardly force the gauging chains apart at their idling ends until the distance between the chains at this point is equal to approximately the largest diameter of the beet passing between said chains.

Such forcing of the idling ends of chain 11 apart causes members 44 to operate levers 47 through the links 45. Levers 47 operate links 51 which raise or lower the knife holder 57 of the cutting plane of the knives.

A large beet will therefore lower the knives to a greater extent than a small beet permitting the knives to amputate the correct amount of top from the body of the beet in accordance to the size of said beet. This method may be used with success since all the beets have been alined by roller bars 71 in such manner as to have the tops of the body of the beets all in the same plane. This makes it a simple matter to correctly top the beets by regulating the distance of the cutting planes of the knives below the plane with which the tops of the bodies of the beets have been alined before each beet is presented to the knives.

A spring 62 raises the knives 72 after they have acted upon a beet allowing the knives to be reset in the manner just indicated by the next beet to be presented to them.

What is claimed as new and is desired to be secured by Letters Patent of the United States is:

1. A conveyor for successive single articles, the conveyor alining the tops of the articles and moving all of such articles along a predetermined path, knives having an axis of rotation angular to the axis of articles in said conveyor, a pair of movable members converging at an end into the path of articles in said conveyor, the converging end of said members being at opposite sides of an article in said conveyor and separable by an article conveyed therebetween, and means connecting said members and said knives for shifting the position of the cutting edges of said knives coincidentally with the separation of the converging ends of said members.

2. In combination, article conveying means comprising a device for alining in a definite plane the tops of articles conveyed therein, knives having an axis of rotation angular to the axis of articles in said conveyor in the path of articles so conveyed and having cutting edges movable relatively to such definite plane, paired members engaging the bodies of such articles in succession, said paired members normally being arranged in the path of articles in said conveyor and being movable away from one another by the articles in said conveyor, means urging said paired members toward one another into their normal relation, and connecting members between said paired members and said knives for shifting the latter coincident to movement of said members away from one another.

3. A conveyor for successive single articles, the conveyor aligning the tops of the articles and moving all of such articles along a predetermined path, knives in said path and having cutting edges movable relative to said conveyor, paired members comprising opposed endless bands having a path of movement angular to said predetermined path and converging at an end, and means for shifting the position of the cutting edges of said knives coincidentally with the engagement of the convergent ends of said bands with an article in said conveyor.

4. A conveyor for successive single articles, the conveyor aligning the tops of the articles and moving all of such articles along a predetermined path, knives in said path and having cutting edges movable relative to said conveyor, paired members comprising opposed endless bands having a path of movement angular to said predetermined path and converging at an end, means for moving said bands in synchronism with the movement of articles in said conveyor, and means for shifting the position of the cutting edges of said knives coincidentally with the engagement of the convergent ends of said bands with an article in said conveyor.

5. An article treating apparatus comprising a conveyor for conveying successive single articles along a predetermined path, said conveyor comprising a first conveyor means adapted to grip and convey the article at a predetermined lower point thereon and a second conveyor means adapted to positively grip and convey the article at a predetermined upper point thereon, article treating means adapted to engage and operate upon the article at a point between the said conveyor means, means for driving the article treating means, and means controlled by the size of the article for varying the position at which the article is engaged by the article treating means.

6. An article treating apparatus comprising a conveyor for conveying successive single articles along a predetermined path, said conveyor comprising a first conveyor means adapted to grip and convey the article at a predetermined lower point thereon and a second conveyor means adapted to positively grip and convey the article at a predetermined upper point thereon, article treating means comprising a pair of rotary cutting knives adapted to engage and cut the article at a point between said conveyor means, means for driving the rotary knives, and means controlled by the size of the article for varying the position at which the article is engaged by said knives.

7. An article treating apparatus comprising a conveyor for conveying successive single articles along a predetermined path, said conveyor comprising a first conveyor means adapted to grip and convey the article at a predetermined lower point thereon and a second conveyor means adapted to positively grip and convey the article at a predetermined upper point thereon, article treating means comprising a pair of rotary knives adapted to engage and cut the article at a point between the said conveyor means, means for driving the rotary knives, one of said conveyor means including a pair of elements relatively separable in accordance with the size of the article engaged thereby, and connections between the rotary knives, said driving means, and said elements whereby upon shifting of said elements the knives and said knife driving means are shifted to vary the position at which the article is engaged thereby.

8. An article treating apparatus comprising a conveyor for conveying successive single articles along a predetermined path, said conveyor comprising a pair of endless bands adapted to grip and convey the article at a predetermined lower point thereon, additional conveyor means adapted to positively grip and convey the article at a predetermined upper point thereon, article treating means comprising a knife adapted to engage and cut the article at a point between said bands and said additional conveyor means, said bands converging toward a point and being adapted to be separated as the article passes therebetween in accordance with the size of the article, and connections between the bands and the knife whereby to control the position at which the knife engages the article in accordance with the separable movements of the bands.

9. An article treating apparatus comprising a conveyor for conveying successive single articles along a predetermined path, said conveyor comprising a first conveyor means adapted to grip and convey the article at a predetermined lower point thereon and a second conveyor means adapted to positively grip and convey the article at a predetermined upper point thereon, the paths of the two conveyor means being relatively angularly disposed, article treating means adapted to engage and operate upon the article at a point between the said conveyor means, means for driving the article treating means, and means controlled by the size of the article for varying the position at which the article is engaged by the article treating means.

10. An article treating apparatus as defined in claim 5 wherein said second conveyor means comprises elongated guide means and mechanism for maintaining the article in engagement with the guide means while positively conveying the article longitudinally of the guide means.

11. An article treating apparatus as defined in claim 5 wherein said second conveyor means comprises a series of roller bars adapted to positively grip and convey the article along a predetermined path.

WILLIAM E. URSCHEL.